United States Patent
Mathew et al.

(10) Patent No.: US 9,786,316 B2
(45) Date of Patent: Oct. 10, 2017

(54) MULTI-TRACK DATA READERS WITH ITERATIVE INTER-TRACK INTERFERENCE CANCELLATION

(71) Applicant: Avago Technologies General IP (Singapore) Pte. Ltd., Singapore (SG)

(72) Inventors: George Mathew, San Jose, CA (US); Jongseung Park, Allentown, PA (US); Richard Rauschmayer, Longmont, CO (US); Bruce A. Wilson, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/957,349

(22) Filed: Dec. 2, 2015

(65) Prior Publication Data
US 2017/0162224 A1 Jun. 8, 2017

(51) Int. Cl.
*G11B 5/035* (2006.01)
*G11B 20/10* (2006.01)

(52) U.S. Cl.
CPC ........ *G11B 20/10212* (2013.01); *G11B 5/035* (2013.01); *G11B 20/10009* (2013.01); *G11B 20/10046* (2013.01)

(58) Field of Classification Search
None
See application file for complete search history.

(56) References Cited

U.S. PATENT DOCUMENTS

| 8,599,508 | B1 | 12/2013 | Burd |
| 8,773,794 | B2 | 7/2014 | Mathew et al. |
| 8,896,956 | B1 * | 11/2014 | Nangare .......... G11B 20/10046 360/65 |
| 8,902,536 | B1 * | 12/2014 | Hwang .............. G11B 5/59627 360/75 |
| 8,947,805 | B1 * | 2/2015 | Coker .............. G11B 20/10046 360/39 |
| 9,025,267 | B1 | 5/2015 | Wang et al. |
| 9,105,277 | B1 | 8/2015 | Harada et al. |
| 2014/0043708 | A1 * | 2/2014 | Erden ................. G11B 20/1217 360/39 |
| 2014/0160590 | A1 * | 6/2014 | Sankaranarayanan ... G11B 5/09 360/45 |
| 2014/0233129 | A1 * | 8/2014 | Xiao ................. G11B 20/10046 360/39 |
| 2015/0029608 | A1 * | 1/2015 | Mathew ........... G11B 20/10268 360/30 |
| 2015/0062730 | A1 * | 3/2015 | Mathew ........... G11B 20/10018 360/29 |

(Continued)

*Primary Examiner* — Tan X Dinh
(74) *Attorney, Agent, or Firm* — Sheridan Ross P.C.

(57) ABSTRACT

An apparatus for two-dimensional magnetic recording includes an array reader comprising a number of read sensors configured to read data from at least one track on a storage medium, a number of two-dimensional equalizer circuits each comprising inputs for receiving signals derived from each of the read sensors, each comprising an equalized output, and a number of iterative inter-track interference cancellation circuits, each operable to cancel inter-track interference in a different one of the equalized outputs from the two-dimensional equalizer circuits.

20 Claims, 3 Drawing Sheets

(56) References Cited

U.S. PATENT DOCUMENTS

| | | | |
|---|---|---|---|
| 2015/0070796 A1* | 3/2015 | Mathew | G11B 20/10046 360/32 |
| 2015/0092289 A1* | 4/2015 | Oberg | G11B 5/5965 360/45 |
| 2015/0116860 A1* | 4/2015 | Coker | G11B 20/10046 360/65 |
| 2015/0199991 A1* | 7/2015 | Mathew | G11B 20/10055 360/65 |

* cited by examiner

MULTI-TRACK DATA READERS WITH ITERATIVE INTER-TRACK INTERFERENCE CANCELLATION

FIELD OF THE INVENTION

Various embodiments of the present invention provide systems and methods for iterative inter-track interference calculation in a multi-track data processor for an array reader magnetic recording system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing modulated electric currents through the head assembly such that corresponding magnetic flux patterns are induced in the storage medium. To retrieve the stored data, the head assembly is positioned again over the track as the storage medium is rotated. In this position, the previously stored magnetic flux pattern induces currents in the head assembly that can be converted to the previously recorded digital data. However, as recording density is increased for greater storage capacity, inter-track interference is increased, distorting the data patterns recorded on the storage medium.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Embodiments of the present invention are related to iterative inter-track interference calculation in a multi-track data processor for an array reader magnetic recording system. In a magnetic storage system, high recording density leads to interference between data symbols during readback. Interference between data symbols in neighboring tracks is referred to herein as inter-track interference (ITI). Interference between data symbols in the same track is referred to herein as inter-symbol interference (ISI). The level of inter-track interference can be estimated by correlating read back signals from each track being processed with representations of data in adjacent tracks, also referred to as side tracks or neighboring tracks. These estimates are used to generate inter-track interference cancellation signals which can be used to cancel the inter-track interference in the read back signals.

In the multi-track detection disclosed herein, more than one data track can be processed in parallel, for example based on read back signals from multiple sensors in an array reader. Inter-track interference cancellation is applied in an iterative manner to the data from the data tracks being read. In some embodiments, the iterative inter-track interference cancellation is initially applied based on rapidly generated detected symbol values for the data tracks. As data from the data tracks are iteratively processed in data detector and data decoder circuits, the output from the data decoder and/or data detector circuits is used to reapply the inter-track interference cancellation. In this manner, as the data detector and data decoder circuits correct errors in the data and converge toward error free data, those improving results are used to reapply the inter-track interference cancellation so that the input to the data detector and data decoder circuits is also improved by better inter-track interference cancellation for subsequent detection and decoding iterations.

Figure 1:
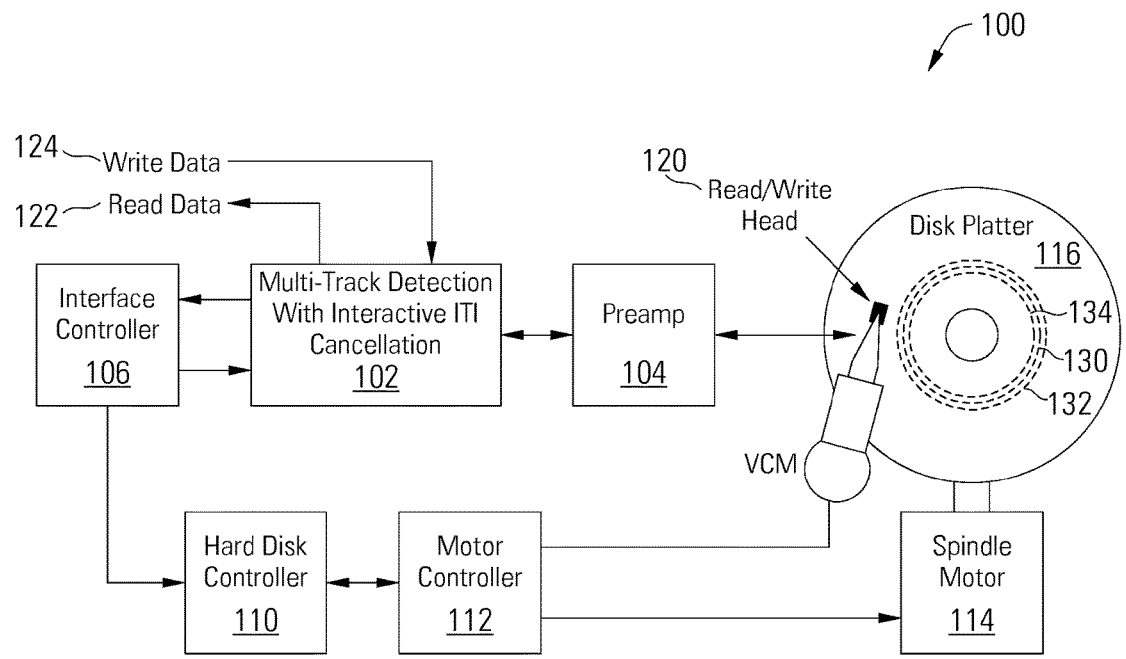
FIG. 1 depicts an array-reader magnetic recording storage system including a multi-track detection read channel with iterative inter-track interference cancellation in accordance with one or more embodiments of the present invention.

Turning to FIG. 1, storage system 100 is illustrated as an example application of multi-track detection with iterative inter-track interference cancellation in accordance with some embodiments of the present invention. The storage system 100 includes a read channel circuit 102 with multi-track detection and iterative inter-track interference cancellation. Storage system 100 may be, for example, a hard disk drive. Storage system 100 also includes a preamplifier 104, an interface controller 106, a hard disk controller 110, a motor controller 112, a spindle motor 114, a disk platter 116, and an array reader read/write head assembly 120. Interface controller 106 controls addressing and timing of data to/from disk platter 116. The data on disk platter 116 consists of groups of magnetic signals that may be detected by read heads in the array reader read/write head assembly 120 when the assembly is properly positioned over data tracks on disk platter 116. Example data tracks 130, 132, 134 are illustrated on disk platter 116, indicated as dashed lines. In some embodiments, the level of inter-track interference is estimated by correlating a read back signal from one data track (e.g., 130) with a representation of data in the next data track (e.g., 132) and vice versa. These estimates are used to generate inter-track interference cancellation signals which can be used to cancel the inter-track interference in the read back signals for each data track.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, magnetic signals representing data on disk platter 116 are sensed by read heads in the read/write head assembly 120 as disk platter 116 is rotated by spindle motor 114. The sensed magnetic signals are provided as a continuous, minute analog signals representative of the magnetic data on disk platter 116. These minute analog signals are transferred from read/write head assembly 120 to read channel circuit 102 via preamplifier 104. Preamplifier 104 is operable to amplify the minute analog signals accessed from disk platter 116. In turn, read channel circuit 102 digitizes the received analog signals and applies iterative inter-track interference cancellation, symbol value detection and decoding to recreate the information originally written to disk platter 116. This data is provided as read data 122 to a receiving circuit. A write operation is substantially the opposite of the preceding read operation with write data 124 being provided to read channel circuit 102. This data is then encoded and written to disk platter 116.

Figure 2:
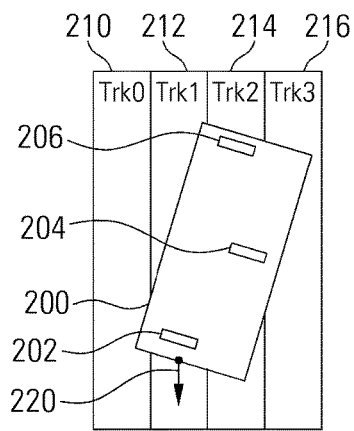
FIG. 2 depicts an array reader positioned to read a pair of data tracks on a magnetic storage medium in accordance with one or more embodiments of the present invention.
Figure 3:
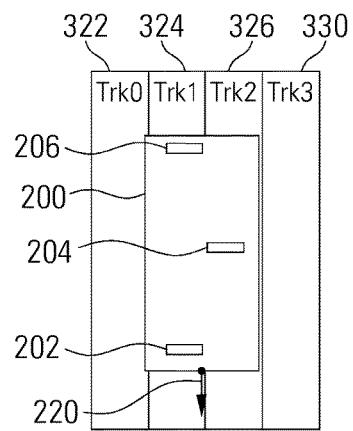
FIG. 3 depicts an array reader positioned to read another pair of data tracks on a magnetic storage medium in accordance with one or more embodiments of the present invention, depicting rotation of the array reader as it is positioned in another location of the magnetic storage medium.

Data tracks can be processed in parallel, deriving data for the data tracks from read heads in an array reader in some embodiments. Turning to FIGS. 2 and 3, an example array reader 200 is depicted which includes three magnetoresistive read heads 202, 204, 206, which can be used to read one or more data tracks simultaneously. For example, as depicted in FIG. 2, the array reader 200 is positioned to read two data tracks 212, 214 from a group of neighboring data tracks 210, 212, 214, 216. As depicted in FIG. 3, the array reader 200 is positioned to read two other data tracks 324, 326 from another group of neighboring data tracks 322, 324, 326, 330. Although the data tracks 210, 212, 214, 216, 322, 324, 326, 330 are depicted in FIGS. 2 and 3 as being straight for simplicity, the tracks are actually curved around the disk platter as shown in FIG. 1. As the voice coil motor (VCM) rotates the arm to sweep the read/write head assembly across the disk platter between the inner radius and outer radius, the angle of the read/write head assembly changes, that is, the read/write head assembly rotates with respect to target tracks over which it is positioned. Thus, generally, multiple read heads 202, 204, 206 in an array reader 200 are not all centered over the one or two target tracks being read. This increases inter-track interference in signals from various read heads and causes the inter-track interference to occur to varying degrees at various locations across the disk platter. For example, when reading and processing data tracks 212, 214 in parallel, there will be some inter-track interference on data track 212 from data track 214 and vice versa. By reading and processing the data tracks 212, 214 in parallel, the inter-track interference from each of the data tracks 212, 214 on the other can be calculated and cancelled in an iterative fashion as the true values of the data in the data tracks 212, 214 are identified and errors are corrected.

The signals representing data tracks on a storage device can be obtained in any suitable manner, and from any suitable storage device. In embodiments employing an array reader with multiple read heads, one or more of the read heads can be disabled in some operating modes. Although the examples disclosed herein include processing two data tracks in parallel and applying iterative inter-track interference cancellation based upon the data values in those two data tracks, the multi-track detection and iterative inter-track interference cancellation disclosed herein can be applied to processing of any number of data tracks in parallel. Based upon the disclosure provided herein, one of ordinary skill in the art will recognize a variety of sources from which data signals may be derived. Furthermore, based upon the disclosure provided herein, one of ordinary skill in the art will recognize the application of the multi-track detection and iterative inter-track interference cancellation disclosed herein to parallel processing of other numbers of data tracks.

Figure 4:
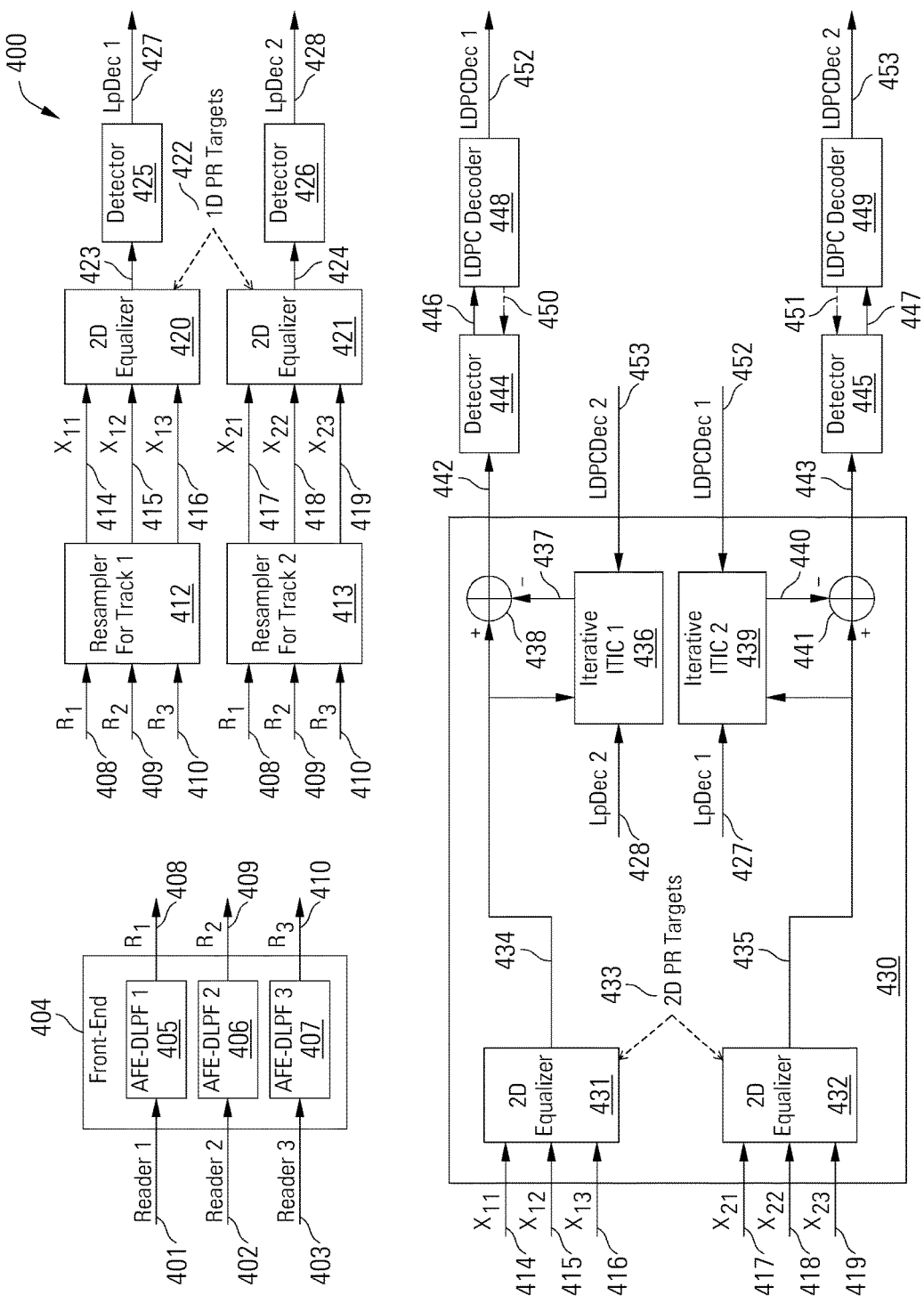
FIG. 4 depicts a read channel with multi-track detection and iterative inter-track interference cancellation in accordance with one or more embodiments of the present invention.

Turning to FIG. 4, a read channel 400 with multi-track detection and iterative inter-track interference cancellation is depicted in accordance with one or more embodiments of the present invention. The read channel 400 is used to process analog signals 401, 402, 403 and to retrieve user data from the analog signals 401, 402, 403 without errors. Analog signals 401, 402, 403 can be derived from read heads in an array reader in a magnetic storage medium. Based upon the disclosure provided herein, one of ordinary skill in the art will recognize a variety of sources from which analog signals 401, 402, 403 may be derived.

The read channel 400 includes a front end 404 that receives and processes the analog signals 401, 402, 403. Front end 404 include front end circuits 405, 406, 407 such as, but not limited to, analog front end (AFE) filters and amplifiers, analog to digital converters, and digital low pass filters (DLPF) as are known in the art. Based upon the disclosure provided herein, one of ordinary skill in the art will recognize a variety of circuitry that may be included as part of front end 404. The feedback loops driving each read head, e.g., timing, gain, DC cancellation, loop pulse estimation, etc., are adapted for the detection of the data track to which the read head is most closely aligned. Front end 404 receives and processes the analog signals 401, 402, 403, and provides corresponding digital signals $R_1$ 408, $R_2$ 409, $R_3$ 410. Depending on the positioning of the array reader over one or more data tracks, digital signals $R_1$ 408, $R_2$ 409, $R_3$ 410 can contain information from one or more data tracks, including inter-track interference content.

The digital signals $R_1$ 408, $R_2$ 409, $R_3$ 410 are provided to resamplers 412, 413, which include banks of interpolators that resample digital signals $R_1$ 408, $R_2$ 409, $R_3$ 410, varying the sampling phase in the output signals as needed to support timing recovery for loop equalizers 420, 421 and loop detectors 425, 426, based on the data track being targeted in each data path. The resampler 412 in the path for a first data track resamples the digital signals $R_1$ 408, $R_2$ 409, $R_3$ 410 to generate X samples $X_{11}$ 414, $X_{12}$ 415, $X_{13}$ 416. The resampler 413 in the path for the second data track resamples the digital signals $R_1$ 408, $R_2$ 409, $R_3$ 410 to generate X samples $X_{21}$ 417, $X_{22}$ 418, $X_{23}$ 419.

The X samples $X_{11}$ 414, $X_{12}$ 415, $X_{13}$ 416 in the data path for the first track are equalized in a two-dimensional (or joint) equalizer 420, and the X samples $X_{21}$ 417, $X_{22}$ 418, $X_{23}$ 419 in the data path for the second track are equalized in a two-dimensional equalizer 421, yielding equalized outputs 423, 424, respectively. Each of the two-dimensional equalizers 420, 421 includes two banks of three filters, each bank equalizing its output to a one-dimensional partial response target 422. The two-dimensional equalizers 420, 421 are configured to equalize all three or a selected two of the readers into the one-dimensional partial response targets 422 for each track and to suppress the inter-track interference from the other track. This facilitates the use of detectors 425, 426 based on one-dimensional inter-symbol interference trellises for loop decisions. Adaptation of the two-dimensional equalizers 420, 421 and one-dimensional partial response targets 422 can be performed in any suitable manner using loop decisions 427, 428. The two-dimensional equalizers 420, 421 each operate on an expanded signal space describing the joint properties of signal and noise on the target data tracks. In other words, the signal portion of the input to each two-dimensional equalizer 420, 421 is derived from multiple target data tracks, and contains all possible options for the bits or symbols in the multiple target data tracks. In some embodiments, the two-dimensional equalizers 420, 421 are digital finite impulse response filters that increase the signal-to-noise ratio in the equalized outputs 423, 424 for their corresponding target data tracks. Based upon the disclosure provided herein, one of ordinary skill in the art will recognize a variety of equalizer circuits that can be used in relation to different embodiments of the present invention.

The equalized outputs 423, 424 are provided to loop detector circuits 425, 426, operable to apply a data detection algorithm to the equalized outputs 423, 424 to yield loop detected outputs 427, 428. The loop detector circuits 425, 426 may be any circuits known in the art that apply some type of algorithm designed to return a representation of the data from which analog inputs 401, 402, 403 were derived. The loop detector circuit 425, 426 can comprise relatively simpler detector circuits than backend data detector circuits 444, 445, providing a rapid first estimation of the true data values that can be used to determine timing feedback and other operations designed to align the sampling of analog to digital converters in front end 404 or to adjust a gain applied by analog front end circuits in front end 404 or to determine the sequences of sampling-phases in the resamplers 412, 413. Based upon the disclosure provided herein, one of ordinary skill in the art will recognize a variety of circuits capable of providing a representation of the data from which analog inputs 401, 402, 403 were derived that may be used in relation to different embodiments of the present invention.

The resampled X samples $X_{11}$ 414, $X_{12}$ 415, $X_{13}$ 416 are also equalized in a backend two-dimensional equalizer 431, and the resampled X samples $X_{21}$ 417, $X_{22}$ 418, $X_{23}$ 419 are also equalized in a backend two-dimensional equalizer 432, yielding equalized outputs 434, 435. The same resamplers 412, 413 are used in both the loop path and the backend path in some embodiments, even if there is a track-to-track write frequency offset. Each of the two-dimensional equalizers 431, 432 includes two banks of three filters, each bank equalizing its output to a two-dimensional partial response target 433, comprising an inter-symbol interference partial response target (e.g., 3-tap) in conjunction with an inter-track interference target from inter-track interference cancellation circuits 436, 439. The two-dimensional equalizers 431, 432 each operate on an expanded signal space describing the joint properties of signal and noise on the target data tracks. In other words, the signal portion of the input to each two-dimensional equalizer 431, 432 is derived from multiple target data tracks, and contains all possible options for the bits or symbols in the target data tracks. In some embodiments, the two-dimensional equalizers 431, 432 are digital finite impulse response filters that increase the signal-to-noise ratio in the equalized outputs 434, 435 for their corresponding target data tracks. In some embodiments, one-dimensional partial response targets are used with equalizers 431, 432 jointly with the inter-track interference cancellation. Adaptation of the two-dimensional equalizers 431, 432 and two-dimensional partial response targets 433 can be performed in any suitable manner using loop decisions 427, 428.

Iterative inter-track interference cancellation circuits 436, 439 calculate estimations 437, 440 of the effect or inter-track interference from at least one neighboring data track on the target data track, enabling subtraction circuits 438, 441 to subtract out the inter-track interference estimations 437, 440. The iterative inter-track interference cancellation circuits 436, 439 can apply any suitable algorithm for calculating the effect of a neighboring track on a target track. The inter-track interference estimations 437, 440 are calculated based on the data values of the neighboring data track in an iterative process. Based upon the disclosure provided herein, one of ordinary skill in the art will recognize a variety of circuitry that may be included as part of iterative inter-track interference cancellation circuits 436, 439. In some embodiments, equalizers 431, 432 and the inter-track interference filter in inter-track interference cancellation circuits 436, 439 are jointly optimized based on the estimates 437, 440 of inter-track interference.

As the correct values for the neighboring data track are identified and updated, the calculation of inter-track interference estimations 437, 440 in iterative inter-track interference cancellation circuits 436, 439 is repeated and updated. Thus the inter-track interference estimations 437, 440 that are subtracted from the equalized outputs 434, 435 can be improved over time, increasing the likelihood that subsequent detection and decoding iterations will be able to detect and correct errors in the data. In some embodiments, the iterative inter-track interference cancellation circuits 436, 439 initially use the loop detected outputs 427, 428 from the loop detectors 425, 426 as the data values of the neighboring data track, followed in later iterations by decoder outputs 452, 453. The values of the data in the second track are represented either by loop detected output 428 or decoder output 453 and are used by iterative inter-track interference cancellation circuit 436 to identify the effect of interference from the second track on the first track. Similarly, the values of the data in the first track are represented either by loop detected output 427 or decoder output 452 and are used by iterative inter-track interference cancellation circuit 439 to identify the effect of interference from the first track on the second track.

In some embodiments, equalized outputs 434, 435 to which inter-track interference cancellation has been applied in subtractors 438, 441 are provided as detector inputs 442, 443 to data detector circuits 444, 445. Data detector circuits 444, 445 are operable to applying a data detection algorithm to detector inputs 442, 443 to determine the correct values of data symbols in detector inputs 442, 443. In some embodiments, the data detection algorithm may be but is not limited to, a soft output Viterbi algorithm (SOVA), or a maximum a posteriori detection algorithm as are known in the art. In some embodiments, the detectors 444, 445 operate based on one-dimensional trellis governed by the underlying inter-symbol interference target in equalizer outputs 434, 435 since inter-track interference terms 437, 440 are cancelled from the equalizer outputs 434, 435. Based upon the disclosure provided herein, one of ordinary skill in the art will recognize a variety of data detection algorithms that may be used in relation to different embodiments of the present invention. Detector outputs 446, 447 from data detector circuits 444, 445 are provided to data decoder circuits 448, 449 which apply a data decoding algorithm to detector outputs 446, 447 in an attempt to recover originally written data. Data decoder circuits 448, 449 may be any data decoder circuit known in the art that is capable of applying a decoding algorithm to a received input. Data decoder circuits 448, 449 may be, but are not limited to, low density parity check decoder circuits or Reed Solomon decoder circuits as are known in the art. Based upon the disclosure provided herein, one of ordinary skill in the art will recognize a variety of data decoder circuits that may be used in relation to different embodiments of the present invention.

One or more iterations through the combination of data detector circuits 444, 445 and data decoder circuits 448, 449 may be made in an effort to converge on the originally written data set. Processing through both the data detector circuit and the data decoder circuit is referred to as a global iteration, as opposed to local iterations applied in the data decoder circuits 448, 449. For the first global iteration, data detector circuits 444, 445 apply the data detection algorithm to detector inputs 442, 443 without guidance from a decoder output. For subsequent global iterations, data detector circuits 444, 445 apply the data detection algorithm to detector inputs 442, 443 as guided by decoder outputs 450, 451. Where the original data is recovered (i.e., the data decoding algorithm converges) or a timeout condition occurs, data decoder circuits 448, 449 provide the result of the data decoding algorithm as decoder outputs 452, 453, which are also updated after each global iteration and used by iterative inter-track interference cancellation circuits 436, 439 to calculate the estimates 437, 440 of inter-track interference. Notably, the detector inputs 442, 443 can differ somewhat with each subsequent global iteration, as the iterative inter-track interference cancellation circuits 436, 439 recalculate the estimates 437, 440 of inter-track interference based on the changing decoder outputs 452, 453, and the subtractors 438, 441 subtract the new estimates 437, 440 of inter-track interference from the equalizer outputs 434, 435. Memory circuits can be included wherever needed, for example to store the equalized outputs 434, 435 from the backend equalizers 431, 432 for use in multiple global iterations.

If data for the first track converges and the data for a second track has not yet converged, inter-track interference cancellation can be discontinued in the first track data path that has converged when the data detection and decoding operations are finished. The converged decisions for the first track can be used to apply inter-track interference cancellation for the data in the second track once more, and then subsequent detection/decoding iterations can be performed in the second track without further application of inter-track interference cancellation, since the converged decisions for the first track will remain unchanged from that point and inter-track interference cancellation in the second track based on the first track is complete.

The adjacent track information used by the iterative inter-track interference cancellation circuits 436, 439, whether loop detector outputs 427, 428 or decoder outputs 452, 453, is not limited to any particular format. For example, it can be in the form of hard decisions, representing the most likely value for each data symbol, or soft information, representing the likelihood for each possible value of each data symbol (e.g., log likelihood ratios), or both, etc. Where the loop detector outputs 427, 428 and decoder outputs 452, 453 comprise soft information, the estimates 437, 440 are calculated in similar manner by the iterative inter-track interference cancellation circuits 436, 439 and subtracted from the equalizer outputs 434, 435.

In some embodiments, the iterative inter-track interference cancellation circuits 436, 439 apply a block-wise inter-track interference estimation algorithm to compensate for track-to-track write frequency offsets. Where, for example, the radial alignment of bit periods (i.e., data bits) between tracks is offset due to write clock frequency offset between tracks, the radial mis-alignment can increase as traversal in a down-track direction continues. Because of the non-zero frequency offset between tracks, the actual inter-track interference response drifts with time (i.e. down-track) as data is processed from the beginning of a servo wedge to the end of a servo wedge. Consequently, direct correlation of a read back signals from adjacent data tracks does not yield a correct inter-track interference response if the correlation is performed across an entire wedge (i.e., a user data region extending between successive servo wedges). Thus, some embodiments of the iterative inter-track interference cancellation circuits 436, 439 apply a block-wise inter-track interference estimation algorithm to account for the effect of write frequency offset (i.e., the varying phase offset between adjacent tracks).

In one or more embodiments of the present invention, the block-wise inter-track interference estimation and cancellation involves splitting data within a given wedge into successive blocks so that the net phase change across a block of bit periods across adjacent tracks is relatively small compared with a full-sector or servo-wedge. By keeping the net phase change small, the use of direct correlation of adjacent bit periods may be used within each block. An example of block-wise inter-track interference estimation that may be applied is the U.S. Pat. No. 8,773,794 issued Jul. 8, 2014 for "Systems and Methods For Block-Wise Inter-Track Interference Compensation", which is incorporated herein by reference for all purposes.

The iterative inter-track interference cancellation disclosed herein provides inter-track interference cancellation with multi-track data detection without requiring complex two-dimensional data detectors with associated two-dimensional targets and trellises. The loop detectors 425, 426 and backend detectors 444, 445 can be simpler one-dimensional data detectors with one-dimensional trellises and simplified noise predictive finite impulse response filter configuration to handle inter-symbol interference in the track being detected. Independent data decoders 448, 449 can be used to process each data track with iterative inter-track interference cancellation assisted global iterations.

Adaptation of partial response targets and inter-track interference filters can be performed differently in some embodiments depending on whether there is a track-to-track frequency offset. In the absence of a track-to-track frequency offset, for the first global iteration a joint adaptation of the equalizers 431, 432 and inter-track interference filters in inter-track interference cancellation circuits 436, 439 can be performed along with the inter-symbol interference target for detectors 444, 445 using loop detector outputs 427, 428 from loop detectors 425, 426 for both data tracks. From the second global iteration onward, the inter-track interference filters and inter-symbol interference targets are readapted using decoder outputs 452, 453 from decoders 448, 449. Alternatively, the equalizers 431, 432 can also be readapted. In the presence of a track-to-track frequency offset, for the first global iteration a joint adaptation of the equalizers 431, 432 and inter-track interference filters in inter-track interference cancellation circuits 436, 439 can be performed along with the inter-symbol interference target for detectors 444, 445 in quasi-block-wise manner using loop detector outputs 427, 428 from loop detectors 425, 426 for both data tracks. In some cases, this adaptation can be performed using regular sector-wise adaptation (without the block-wise approach) if longer inter-track interference filters are used and if the adaptation is able to track the phase-drift arising from the frequency offset. From the second global iteration onward, the inter-track interference filters and inter-symbol interference targets are readapted in quasi-block-wise manner using decoder outputs 452, 453 from decoders 448, 449. In some embodiments, the equalizers 431, 432 can also be readapted after the first global iteration.

In some embodiments, quasi-block-wise joint adaptation of two-dimensional equalizers 431, 432, one-dimensional inter-symbol interference targets for detectors 444, 445 and inter-track interference filters for inter-track interference cancellation circuits 436, 439 can be performed as follows, with or without track-to-track frequency offsets. Let a block-length be $L_b$ bits. In the first global iteration, obtain loop detector decisions 427 $la_1[n]$ and 428 $la_2[n]$ from loop detectors 425, 426 for tracks one and two, respectively. The corresponding equalizer outputs 423, 424 (y-samples) in the loop paths are denoted as $ly_1[n]$ and $ly_2[n]$, respectively. The initial inter-track interference filters of length $2M_0+1$ (where $M_0 \approx 25$) are estimated by correlating $ly_1[n]$ with $la_2[n]$ and $ly_2[n]$ with $la_1[n]$ during the first $L_b$ samples in the fragment. Let the resulting initial inter-track interference filters be $hl_1[i]$ & $hl_2[i]$, respectively. Let $[h_{01}, k_{01}]=\max(|hl_1[.]|)$ and $[v_{02}, k_{02}]=\max(|hl_2[.]|)$, the value and location of the peak coefficient in the inter-track interference filters.

Estimate the initial phase-offset $(n_0)$ between track 1 and track 2 as $k_{01}-M_0-1$ if $h_{01} \geq h_{02}$ and $M_0-1-k_{01}$ if $h_{02} > h_{01}$. Take the initial phase-offset as zero if $\max(h_{01}, h_{02}) < Thr_0$ where $Thr_0 > 0$ is a threshold to qualify inter-track interference strength.

Select $2M+1$ coefficients (where $M \approx 6$) centered around $hl_1[k_{01}]$ and $hl_2[k_{02}]$ as the starting values of inter-track interference filters for iterative inter-track interference cancellation in the back-end. Let the resulting inter-track interference filters be $h_1[i]$ and $h_2[i]$, respectively. Create phase-shifted decision sequences $a_{02}[n]=la_2[n-n_0]$ and $a_{01}[n]=la_1[n+n_0]$ for use in inter-track interference adaptation.

The two-dimensional equalizers 431, 432, the one-dimensional target for detectors 444, 445 and the inter-track interference filters for both tracks are jointly adapted for the first block of $L_b$ samples. (i.e. $n=1, 2, \ldots, L_b$). Use the available initial values for two-dimensional equalizer filters and one-dimensional targets, and the above obtained initial values for inter-track interference filters. In this adaptation, the inter-track interference terms are computed by convolving the inter-track interference filters $h_1[i]$ and $h_2[i]$ with phase-corrected decision sequences $a_{02}[n]$ and $a_{01}[n]$, respectively.

The following steps are performed for each subsequent block k (k=2, 3, . . . ). Following a similar strategy as above, estimate the phase-shift at the beginning of block k as the difference in location of inter-track interference peak coefficients from the center of the inter-track interference filters (after adaptation in block k−1). Shift $a_{02}[n]$ and $a_{01}[n]$ to account for this phase-drift and also center the inter-track interference filters. Jointly adapt the two-dimensional equalizers 431, 432, the one-dimensional target for detectors 444, 445 and the inter-track interference filters for both tracks for block k (i.e. $n=(k-1)*L_b+1, \ldots, k*L_b$).

Subsequent global iterations begin using several values generated during the first global iteration, the initial phase-offset $(n_0)$ between track 1 and track 2, estimated in the beginning of the global iteration, and the backend two-dimensional equalizer outputs 434, 435 (y-samples) in the backend paths denoted as $by_1[n]$ and $by_2[n]$, respectively.

The following steps are performed for each subsequent global iteration m (m=2, 3, . . . ). The two-dimensional equalizers 431, 432 and the one-dimensional targets for detectors 444, 445 are initialized with values obtained at the end of the (m−1)th global iteration. The inter-track interference filters in iterative inter-track interference cancellation circuits 436, 439 are initialized with coefficients obtained at the end of the first block during the (m−1)th global iteration. In some embodiments, the two-dimensional backend equalizers 431, 432 are not adapted after the first global iteration to minimize hardware complexity and power consumption. Only one-dimensional targets for detectors 444, 445 and inter-track interference filter in iterative inter-track interference cancellation circuits 436, 439 are adapted from the second global iteration onwards, for the same y-samples in equalizer outputs 434, 435 obtained from the first global iteration. Alternatively, in some other embodiments the two-dimensional backend equalizers 431, 432 are adapted with one-dimensional partial response targets and inter-track interference filters in every global iteration.

Decisions in decoder outputs 452, 453 are obtained from decoders 448, 449 for track one and track two, denoted as $ba_1[n]$ & $ba_2[n]$, respectively, after the (m−1)th global iteration. Phase-shifted decision sequences $ba_{02}[n]=ba_2[n-n_0]$ and $ba_{01}[n]=ba_1[n+n_0]$ are created for use in inter-track interference adaptation.

The one-dimensional targets for detectors 444, 445 and the inter-track interference filter in iterative inter-track interference cancellation circuits 436, 439 are jointly adapted for both tracks for the first block (i.e. $n=1, 2, \ldots, L_b$). Use the values available for the one-dimensional targets and the inter-track interference filter as indicated above as initial values. In this adaptation, the inter-track interference terms are computed by convolving the inter-track interference filters $h_1[i]$ and $h_2[i]$ with phase-corrected decision sequences $ba_{02}[n]$ and $ba_{01}[n]$, respectively.

The following steps are performed for each subsequent block k (k=2, 3, . . . ). Estimate the phase-shift at the beginning of block k as the difference in location of the inter-track interference peak coefficient from the center of the inter-track interference filters (after adaptation in block k−1). Shift $ba_{02}[n]$ and $ba_{01}[n]$ to account for this phase-drift and also center the inter-track interference filters. Jointly adapt one-dimensional targets for detectors 444, 445 and inter-track interference filters for both tracks for block k (i.e. $n=(k-1)*L_b+1, \ldots, k*L_b$).

The steps above are repeated for the next global iteration m+1, and so on, until data converges or the limit on the number of global iterations for both tracks has been reached.

Figure 5:
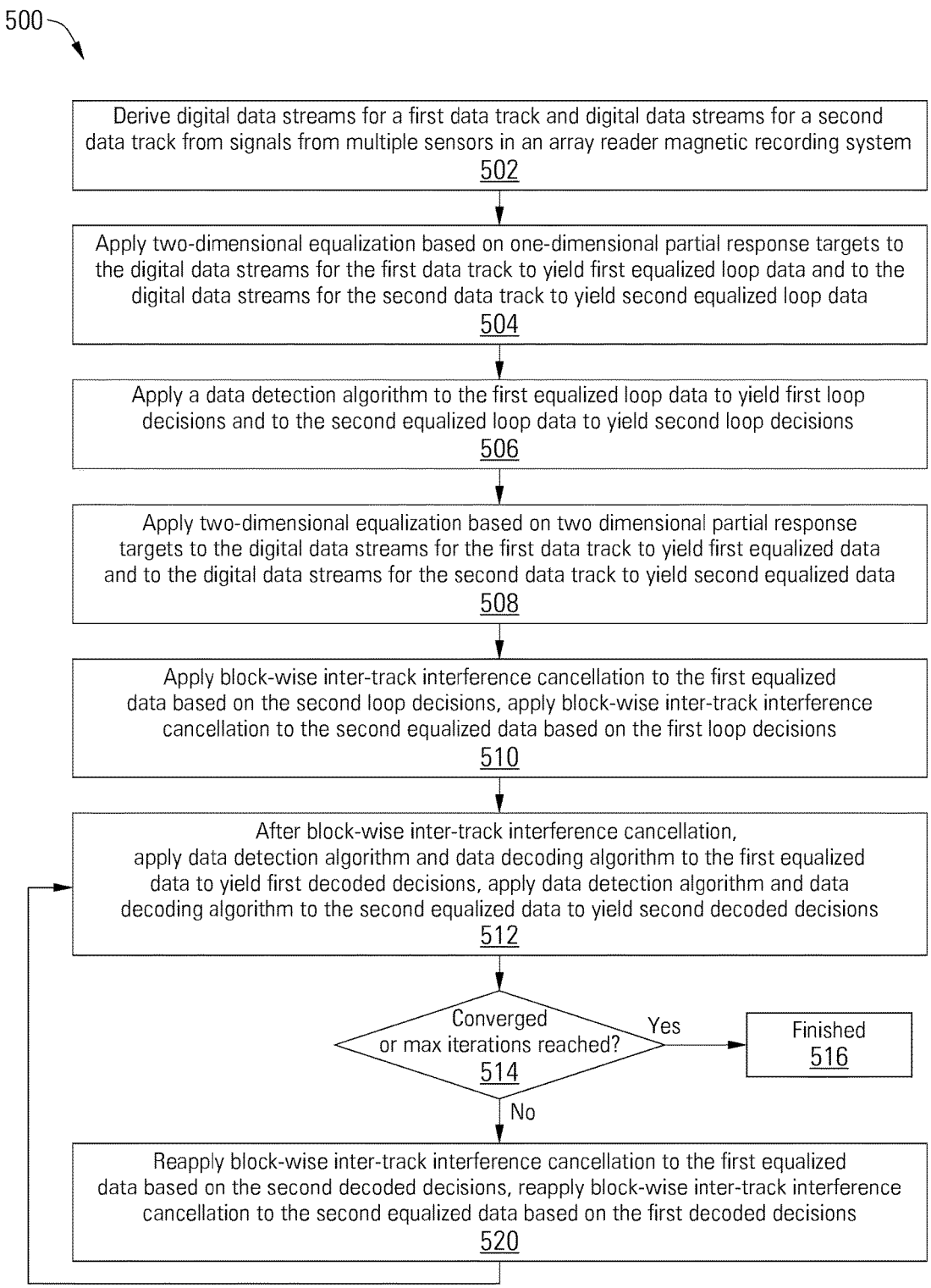
FIG. 5 depicts a flow diagram of an operation for iterative inter-track interference cancellation in a multi-track data processor of an array reader magnetic recording system in accordance with one or more embodiments of the present invention.

Turning to FIG. 5, a flow diagram 500 depicts a method for iterative inter-track interference cancellation in a multi-track data processor of an array reader magnetic recording system in accordance with one or more embodiments of the present invention. Following flow diagram 500, digital data streams for a first data track and digital data streams for a second data track are derived from signals from multiple sensors in an array reader magnetic recording system. (Block 502) Two-dimensional equalization based on one dimensional partial response targets is applied to the digital data streams for the first data track to yield first equalized loop data and to the digital data streams for the second data track to yield second equalized loop data. (Block 504) A data detection algorithm is applied to the first equalized loop data to yield first loop decisions and to the second equalized loop data to yield second loop decisions. (Block 506) Two-dimensional equalization based on two dimensional partial response targets is applied to the digital data streams for the first data track to yield first equalized data and to the digital data streams for the second data track to yield second equalized data. (Block 508) Inter-track interference cancellation is applied to the first equalized data based on the second loop decisions, and to the second equalized data based on the first loop decisions. (Block 510) After block-wise inter-track interference cancellation, data detection and decoding algorithms are applied to the first equalized data to yield first decoded decisions, and to the second equalized data to yield second decoded decisions. (Block 512) A determination is made as to whether the data has converged or the maximum number of global detection/decoding iterations has been reached. (Block 514) If the data has converged or the limit on iterations has been reached, the inter-track interference cancellation/detection/decoding process is finished. (Block 516) If the data failed to converge, additional retry operations can be initiated. If the data has not converged but additional iterations are permitted, inter-track interference cancellation is reapplied to the first equalized data based on the second decoded decisions, and to the second equalized data based on the first decoded decisions. (Block 520) The data detection and decoding algorithms are then reapplied to the first equalized data to yield first decoded decisions, and to the second equalized data to yield second decoded decisions. (Block 512) The process thus continues until the data for each track has converged, or until decoding fails when a limit on the permitted number of detection/decoding iterations is reached.

The multi-track detection with iterative inter-track interference calculation disclosed herein allows two-dimensional equalizers to function with full freedom to shape inter-track interference and inter-symbol interference targets corresponding to the multiple tracks being detected. It allows the inter-track interference target to be as long as needed without impacting the performance of the equalizer or complexity of the detector, unlike existing approaches which tend to limit the inter-track interference target or even omit the inter-track interference cancellation to minimize the complexity of the detector. The use of iterative inter-track interference cancellation allows the power of the decoder to be reflected in the iterative inter-track interference cancellation. Furthermore, it can help to improve the iterative inter-track interference cancellation with each global iteration, thereby providing better and better samples to the detector/decoder back-end with each global iteration.

The quasi-block-wise nature of iterative inter-track interference cancellation in some embodiments compensates for track-to-track frequency offsets that are usually unknown. Because the iterative inter-track interference cancellation circuit removes the effect of track-to-track frequency offsets, the one-dimensional detector for each track can operate without having to be adapted for the frequency offsets. Furthermore, because the iterative inter-track interference cancellation circuit can operate in the presence of track-to-track frequency offsets, the track-writing scheme does not have to be unduly accurate to maintain extremely tight frequency spread during write operations. Synchronous writing is a challenge in hard disk drives, while it is a default requirement to make joint detection of multiple tracks feasible with realizable hardware complexity in conventional systems. The iterative inter-track interference cancellation is able to work with hard decisions or soft decisions from the decoder, thereby giving it the ability to incorporate soft information in iterative inter-track interference cancellation.

It should be noted that a magnetic storage system using multi-track detection with iterative inter-track interference cancellation can be integrated into a larger storage system such as, for example, a RAID (redundant array of inexpensive disks or redundant array of independent disks) based storage system. In addition, it should be noted that a magnetic storage system using multi-track detection with iterative inter-track interference cancellation can be modified to include solid state memory that is used to store data in addition to the storage offered by disk platters. Such solid state memory may be used in parallel to disk platters to provide additional storage. Alternatively, the solid state memory can be used as a cache where it offers faster access time than that offered by disk platters.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, embodiments of the present invention provide novel systems, devices, methods and arrangements for iterative inter-track interference calculation in a multi-track data processor for an array-reader magnetic recording system. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for two-dimensional magnetic recording, comprising:
   an array reader comprising a plurality of read sensors configured to read data from at least one track on a storage medium;
   a first two-dimensional equalizer circuit comprising a first input for receiving signals derived from each of the plurality of read sensors, wherein the first two-dimensional equalizer circuit generates a first equalized output;
   a first iterative inter-track interference cancellation circuit, the first iterative inter-track interference cancellation circuit operable to cancel inter-track interference in the first equalized output;
   a second two-dimensional equalizer circuit comprising a second input for receiving signals derived from each of the plurality of read sensors, wherein the second two-dimensional equalizer circuit generates a second equalized output; and
   a second iterative inter-track interference cancellation circuit, the second iterative inter-track interference cancellation circuit operable to cancel inter-track interference in the second equalized output.

2. The apparatus of claim 1, wherein the plurality of read sensors in the array reader are spaced to read data from two tracks simultaneously on the storage medium.

3. The apparatus of claim 1, further comprising a first data detector with one-dimensional trellises configured to detect data values in the first equalized output after the inter-track interference cancellation and a second data detector with one-dimensional trellises configured to detect data values in the second equalized output after the inter-track interference cancellation.

4. The apparatus of claim 3, further comprising a plurality of data decoder circuits, each configured to decode detected data from one of the first and second data detectors to yield decoder outputs.

5. The apparatus of claim 4, wherein the decoder outputs comprise soft decisions.

6. The apparatus of claim 4, wherein the decoder outputs comprise hard decisions.

7. The apparatus of claim 4, wherein the first and second iterative inter-track interference cancellation circuits each comprise a decoder input configured to receive the decoder outputs, wherein the first and second iterative inter-track interference cancellation circuits, the first and second data detectors and the plurality of data decoder circuits are configured to process data iteratively.

8. The apparatus of claim 7, wherein the equalized output from each of the two-dimensional equalizer circuits is processed in a different data path by a different one of the iterative inter-track interference cancellation circuits, data detectors and data decoder circuits, and wherein the decoder inputs on the iterative inter-track interference cancellation circuits are each connected to one of the data decoder circuits from a different one of the data paths.

9. The apparatus of claim 8, wherein the first and second iterative inter-track interference cancellation circuits each comprise a detector input configured to receive an output from one of the data detectors in a different one of the data paths.

10. The apparatus of claim 7, wherein the first and second iterative inter-track interference cancellation circuits are configured to cancel inter-track interference based at least in part on the decoder inputs after a first global iteration in the iterative inter-track interference cancellation circuits, the data detectors and the data decoder circuits.

11. The apparatus of claim 3, wherein the first and second iterative inter-track interference cancellation circuits each comprise a detector input configured to receive an output from a different one of the data detectors.

12. The apparatus of claim 4, wherein the first and second iterative inter-track interference cancellation circuits comprise filters with tap coefficients adapted based at least in part on cross-track strength information derived from the detected data and the decoder outputs.

13. The apparatus of claim 1, wherein the first and second iterative inter-track interference cancellation circuits are configured to remove a frequency offset in signals read simultaneously from different tracks on the storage medium.

14. The apparatus of claim 1, further comprising a plurality of loop detectors, wherein the first and second iterative inter-track interference cancellation circuits operate a first time for each track based on detected outputs from the loop detectors.

15. A magnetic recording storage system for two-dimensional magnetic recording, the magnetic recording storage system comprising:
an array reader comprising a plurality of read sensors configured to read data from at least one track on a storage medium;
a first two-dimensional equalizer circuit comprising a first input for receiving signals derived from each of the plurality of read sensors, wherein the first two-dimensional equalizer circuit generates a first equalized output;
a first iterative inter-track interference cancellation circuit, the first iterative inter-track interference cancellation circuit operable to cancel inter-track interference in the first equalized output;
a second two-dimensional equalizer circuit comprising a second input for receiving signals derived from each of the plurality of read sensors, wherein the second two-dimensional equalizer circuit generates a second equalized output; and
a second iterative inter-track interference cancellation circuit, the second iterative inter-track interference cancellation circuit operable to cancel inter-track interference in the second equalized output.

16. The magnetic recording storage system of claim 15, wherein the plurality of read sensors in the array reader are spaced to read data from two tracks simultaneously on the storage medium.

17. The magnetic recording storage system of claim 15, further comprising a first data detector with one-dimensional trellises configured to detect data values in the first equalized output after the inter-track interference cancellation and a second data detector with one-dimensional trellises configured to detect data values in the second equalized output after the inter-track interference cancellation.

18. A method for two-dimensional magnetic recording, the method comprising:
providing an array reader comprising a plurality of read sensors configured to read data from at least one track on a storage medium;
providing a first two-dimensional equalizer circuit comprising a first input for receiving signals derived from each of the plurality of read sensors, wherein the first two-dimensional equalizer circuit generates a first equalized output;
providing a first iterative inter-track interference cancellation circuit, the first iterative inter-track interference cancellation circuit operable to cancel inter-track interference in the first equalized output;
providing a second two-dimensional equalizer circuit comprising a second input for receiving signals derived from each of the plurality of read sensors, wherein the second two-dimensional equalizer circuit generates a second equalized output; and
providing a second iterative inter-track interference cancellation circuit, the second iterative inter-track interference cancellation circuit operable to cancel inter-track interference in the second equalized output.

19. The method of claim 18, wherein the plurality of read sensors in the array reader are spaced to read data from two tracks simultaneously on the storage medium.

20. The method of claim 18, the method further comprising providing a first data detector with one-dimensional trellises configured to detect data values in the first equalized output after the inter-track interference cancellation and a second data detector with one-dimensional trellises configured to detect data values in the second equalized output after the inter-track interference cancellation.

* * * * *